United States Patent [19]

Abe

[11] Patent Number: 5,311,609
[45] Date of Patent: May 10, 1994

[54] OPTICAL FIBER CONNECTOR

[75] Inventor: Kengi Abe, Tokyo, Japan

[73] Assignee: Hirose Electric Co., ltd., Tokyo, Japan

[21] Appl. No.: 968,330

[22] Filed: Oct. 29, 1992

[51] Int. Cl.⁵ .................................................. G02B 6/36
[52] U.S. Cl. .......................................... 385/60; 385/56; 385/58; 385/59; 385/71; 385/72; 385/77; 385/78
[58] Field of Search .................... 385/56, 55, 58, 59, 385/60, 70-72, 76-78, 81, 83, 84, 62, 63, 65, 66

[56] References Cited

U.S. PATENT DOCUMENTS

| | | | |
|---|---|---|---|
| 4,516,829 | 5/1985 | Borsuk et al. | 385/78 |
| 4,518,220 | 5/1985 | Swanson | 385/77 |
| 4,805,978 | 2/1989 | Bruch et al. | 385/78 |
| 5,016,968 | 5/1991 | Hammond et al. | 385/78 |
| 5,157,749 | 10/1992 | Briggs et al. | 385/60 |

*Primary Examiner*—Frank Gonzalez
*Attorney, Agent, or Firm*—Kanesaka & Takeuchi

[57] ABSTRACT

An optical fiber connector includes a connector case (1) having a receiving cavity (3); a ferrule (21); a ferrule holder (31) movable within the receiving cavity and holding the ferrule at its front end; and a conical spring (38) for biasing the ferrule holder forwardly so that the ferrule projects forwardly from the receiving cavity.

2 Claims, 6 Drawing Sheets

OPTICAL FIBER CONNECTOR

BACKGROUND OF THE INVENTION

1. Field of the Invention

The present invention relates to optical fiber connectors.

2. Description of the Related Art

FIG. 12 shows an optical fiber connector. A ferrule 21 is held by a ferrule holder 22 which is housed in the receiving cavity 3 of a connector case 1 such that its bosses 23 and 24 are housed in channels 4 and 5 of the connector case 1 respectively.

FIG. 13 shows another optical fiber connector. A connector case 1 is provided at the rear end with a cable receiving aperture 2, into which an optical fiber cable 11 is inserted and secured to the connector case 1 by a threaded nut 12. An optical fiber 13 extends forwardly from the end of the cable 11 and terminates at a ferrule holder 22 which holds a ferrule 21 at the front end. The connector case 1 is provided at the front end with a receiving cavity 3 for housing the ferrule holder 22. The ferrule 21 extends forwardly in a front opening 8 of the connector case 1. A pair of arms 9 extends rearwardly from opposite sides of the connector case 1 for engagement with a mating plug.

In FIG. 14, the ferrule 21 is held by the ferrule holder 22 which is housed in the receiving cavity 3. The ferrule holder 22 is provided at the front end with a conical boss 25 with a flange 26 and at the rear end with a rear front flange 27 which abuts on an end clip 29. A coil spring 28 is placed between the flanges 26 and 27 for biasing the conical boss 25 forwardly so that the corner portion 25a abuts on the aperture 7 of the connector case 1 while the flanges 26 and 27 abut on the inside walls 3b and 3a of the receiving cavity 3, respectively.

In the connector of FIG. 12, however, the gap between the ferrule holder 22 and the receiving cavity 3 is so small that when the ferrule 21 is fitted into a precision sleeve 30, a small radial offset between the ferrule and the precision sleeve 30 causes a collision between them. As a result, the ferrule 21 is pushed rearwardly so that the rear end 22a of the ferrule holder 22 is pushed against the end wall 22a of the receiving cavity 3, producing a friction resistance in proportion to the pushing force. This friction resistance restricts the radial movement of the ferrule 21, making it very difficult to fit the ferrule 21 into the precision sleeve 30.

In the connector of FIG. 13, however, the corner portion 25a of the conical boss 25 abuts on the aperture 7 of the connector case 1 with little or no play so that even when the ferrule 21 is pushed rearwardly upon fitting into the precision sleeve 30, it hardly moves in the radial direction, making it very difficult to fit the ferrule 21 into the precision sleeve 30.

SUMMARY OF THE INVENTION

Accordingly, it is an object of the invention to provide an optical fiber connector with a ferrule movable in the radial direction to such an extent that it is easy to fit the ferrule into a precision sleeve.

According to the invention there is provided an optical fiber connector which includes a connector case having a receiving cavity; a ferrule; a ferrule holder movable within the receiving cavity and holding the ferrule at its front end; and a conical spring for biasing the ferrule holder forwardly so that the ferrule projects forwardly from the receiving cavity.

If the ferrule is not axial agreement with the mating sleeve, it is pushed rearwardly by the mating sleeve against the biasing of the conical spring so that the front flange of the ferrule holder leaves from the transverse rib of the case, thereby permitting large radial movement of the ferrule, making it easy to fitting the ferrule into the precision sleeve.

The above and other objects, features, and advantages of the invention will be more apparent from the following description when taken into conjunction with the accompanying drawings.

DESCRIPTION OF THE PREFERRED EMBODIMENT

Figure 1:
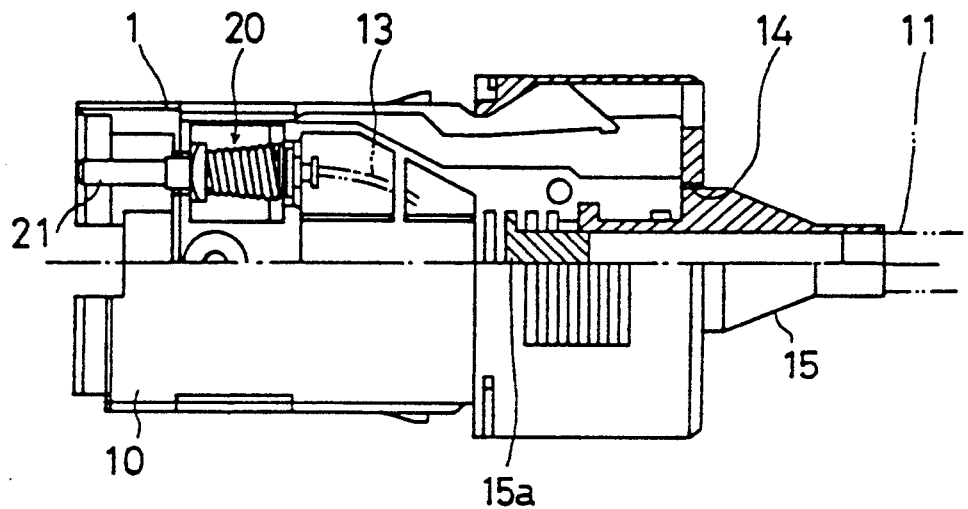
FIG. 1 is a partially sectional, side elevational view of an optical fiber connector according to an embodiment of the invention.
Figure 12:
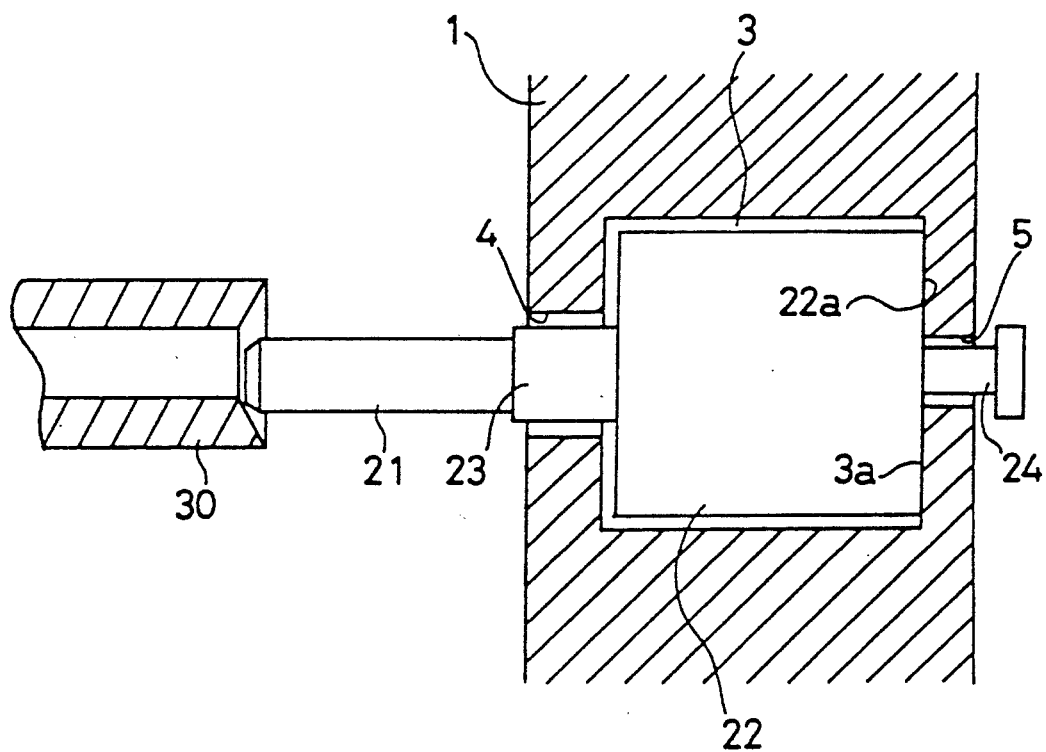
FIG. 12 shows an optical fiber connector prior to the present invention.

In FIG. 1, a connector case 1 is provided at the rear end with an insertion aperture 14 into which a rubber hood 11 is inserted. An optical fiber cable 15 is inserted into the rubber hood 15 and secured by a fastening member 15a. An optical fiber 13 extends forwardly from the end of the cable 11 and terminates at a ferrule holder assembly 20 which holds a ferrule 21 at the front end.

Figure 2:
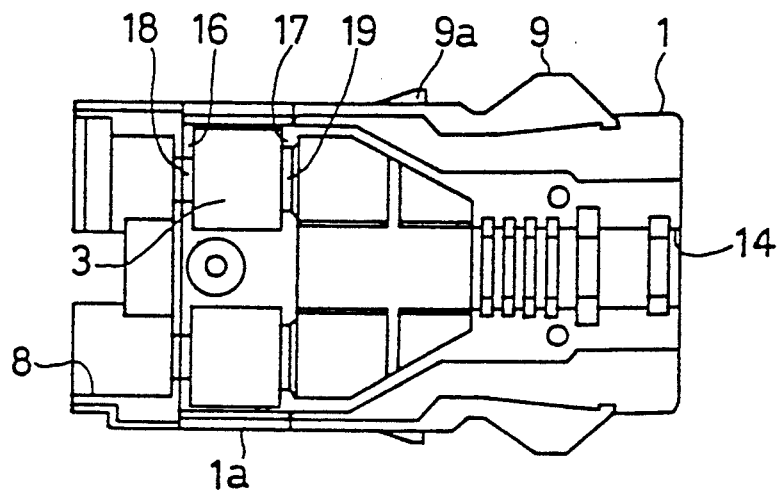
FIG. 2 is a side elevational view of a connector housing for the optical fiber connector.

In FIG. 2, the connector case 1 has an opening mouth 8 at the front portion and the insertion aperture 14 at the rear portion. A pair of arms 9 with a projection 9a extend rearwardly from opposite sides of the case 1. A pair of transverse ribs 16 and 17 are formed in the front portion of the case 1, defining a receiving cavity 3 between them. Semi-circular cuts 18 and 19 are formed on the transverse ribs 16 and 17, respectively, communicating with the receiving cavity 3. The diameter of the semi-circular cut 18 is made larger than that of the front boss 33 of a ferrule holder 31 hereinafter described.

Figure 3:
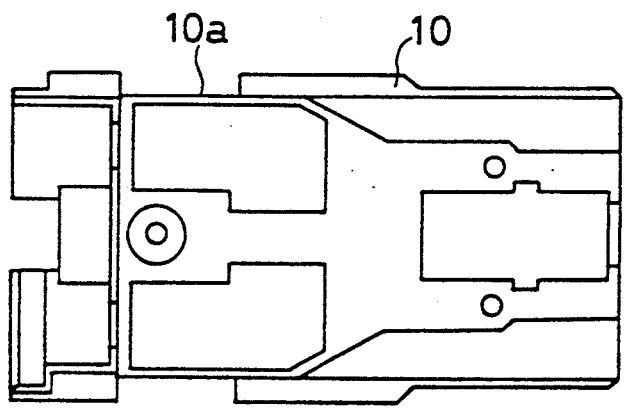
FIG. 3 is a side elevational view of a cover plate for the optical fiber connector.
Figure 4:
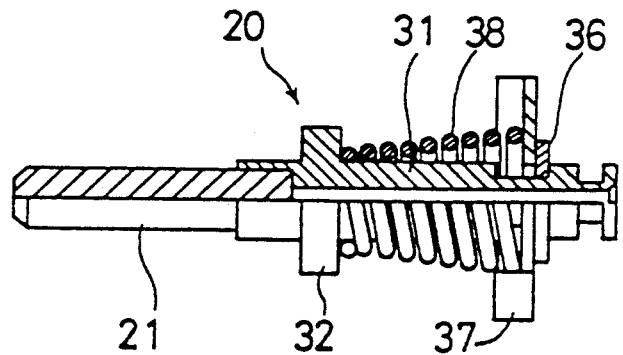
FIG. 4 is a partially sectional, side elevational view of a ferrule holder assembly for the optical fiber connector.
Figure 5:
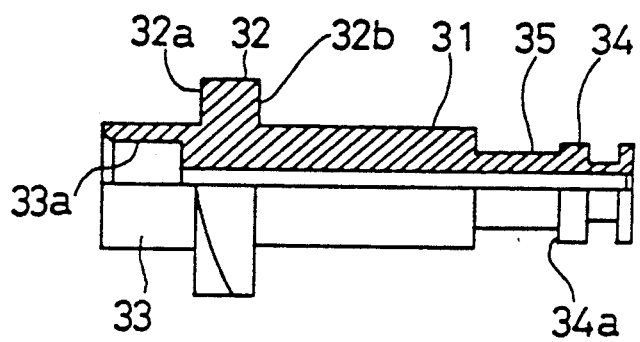
FIG. 5 is a partially sectional, side elevational view of a ferrule holder for the ferrule holder assembly.
Figure 6:
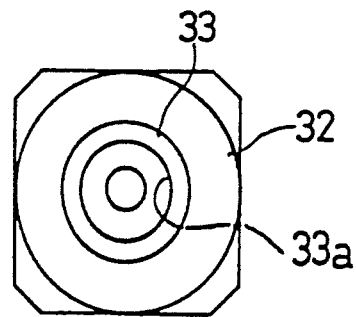
FIG. 6 is a front elevational view of the ferrule holder.
Figure 7:
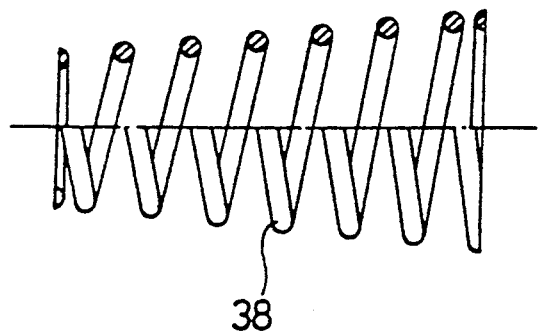
FIG. 7 is a partially sectional, side elevational view of a conical spring for the ferrule holder assembly.

In FIG. 3, the notch 10a of a cover plate 10 receives a protrusion 1a of the connector case 1 to secure the cover plate 10 to the connector case 1.

In FIGS. 4-9, a ferrule 21 is held by a ferrule holder 31 of the ferrule holder assembly 20. A conical spring 38 is placed between a front flange 32 of the ferrule holder 31 and a stop plate 37 abutting on the stop ring 36 which is secured to the rear end of the ferrule holder 31. The boss 33 of the ferrule holder 31 has a ferrule receiving hole 33a. A square flange 32 has a rear face 32b on which the conical spring 38 abuts. When the ferrule holder assembly 20 is placed in the connector case 1, the square flange 32 prevents the ferrule holder 31 from rotation, and the front face 32 of the square flange 32 abuts on the transverse rib 16 under the biasing of the conical spring 38. A rear flange 34 is formed on the rear end portion of the ferrule holder 31. The stop ring 36 is secured to the front face 34a of the flange 34. The stopper plate 37 is movable along a boss 35 and biased by the conical spring 38 against the stop ring 36.

Figure 8:
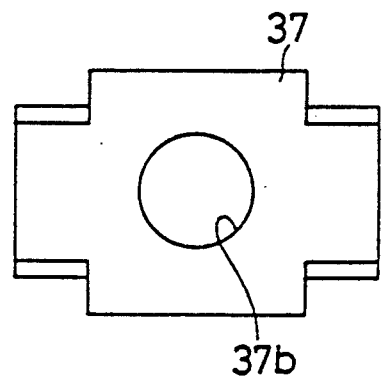
FIG. 8 is a front elevational view of a stopper plate for the optical fiber connector.
Figure 9:
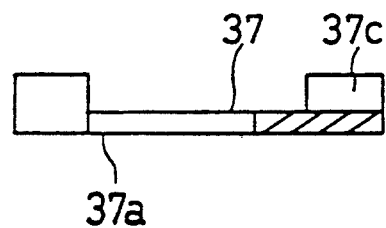
FIG. 9 is a partially sectional, top plan view of the stopper plate.

In FIGS. 8 and 9, the stopper plate 37 has four bent members 37c at the corners to prevent the conical spring 38 from being offset. An aperture 37b having a diameter greater than that of the boss 35 is formed at the center of the stopper plate 37.

Figure 10:
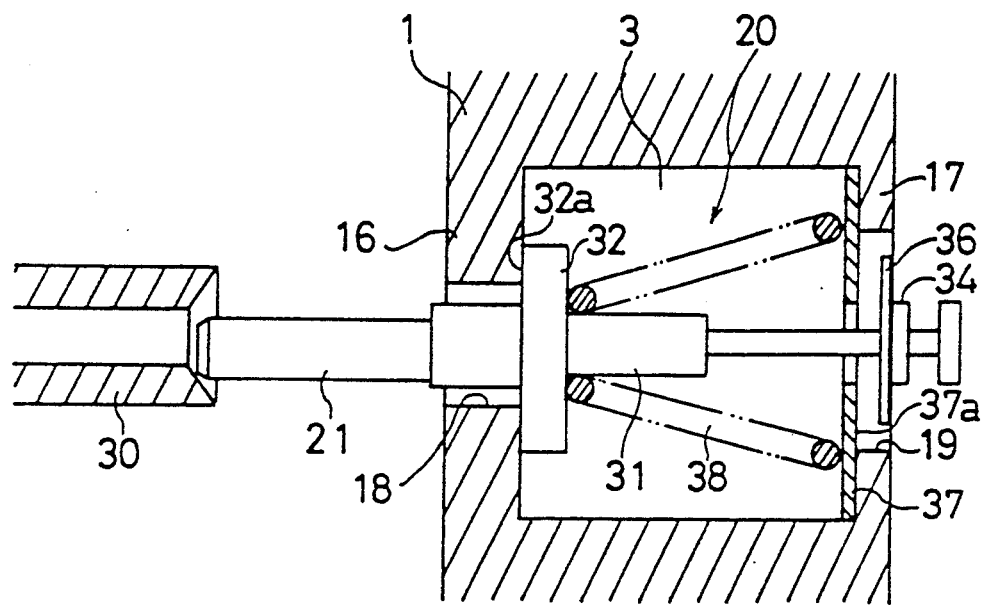
FIGS. 10 and 11 show how the optical fiber connector works.

In FIG. 10, the ferrule holder assembly 20 is housed in the receiving cavity 3 of the connector case 1 such that the front face 32a of the flange 32 and the rear face 37a of the stopper plate 37 are biased by the conical spring 38 against the transverse ribs 16 and 17, respectively.

Figure 11:
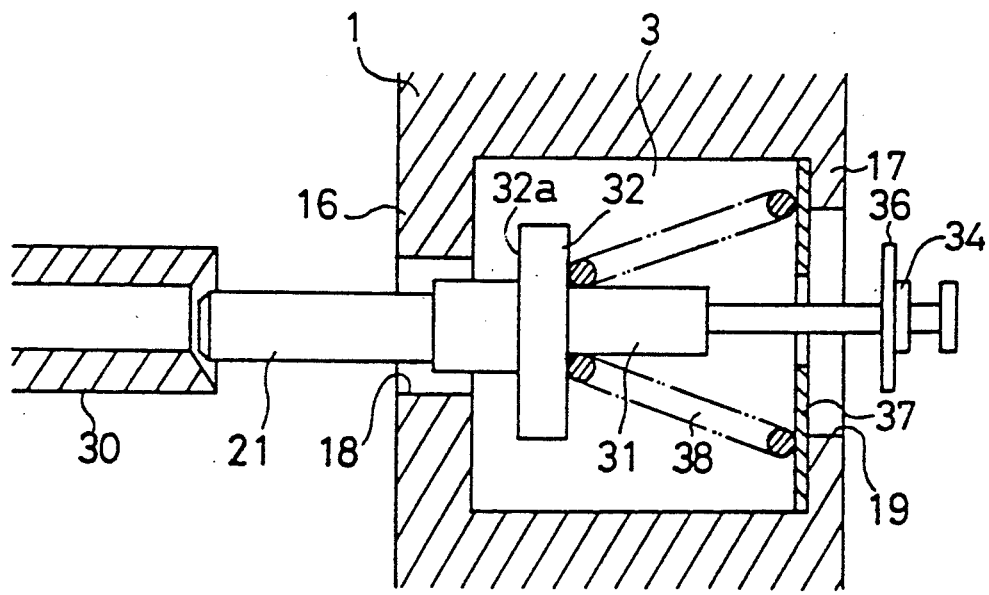
Figure 13:
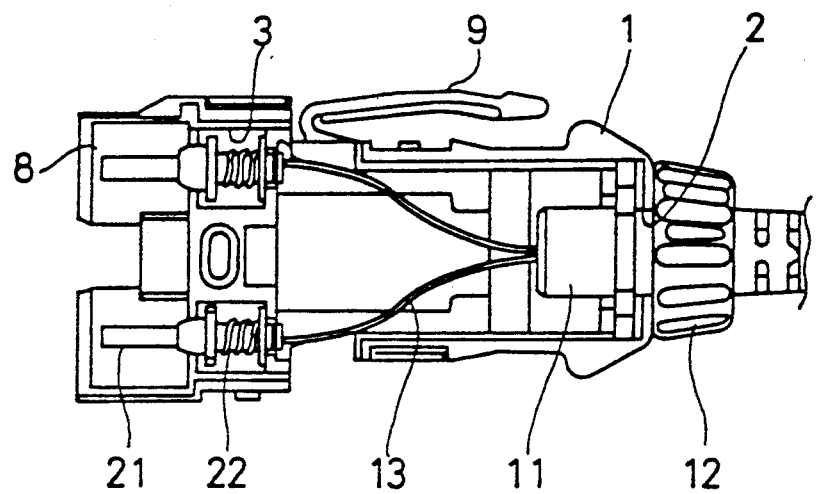
FIG. 13 is a side elevational view of another optical fiber connector prior to the present invention.
Figure 14:
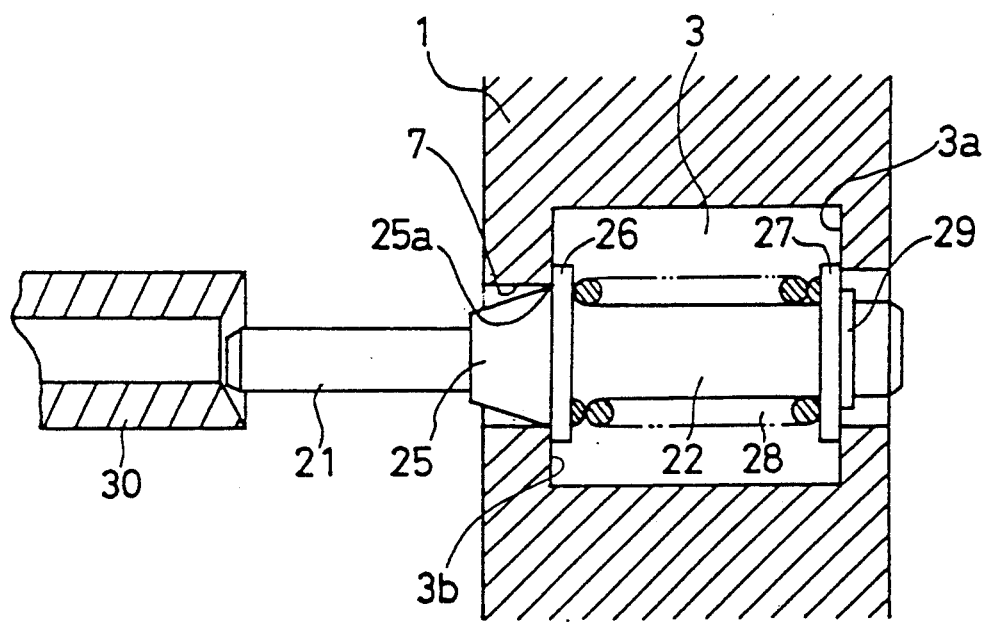
FIG. 14 shows how the other optical fiber connector works.

In FIG. 11, if the ferrule 21 is not axial agreement with the precision sleeve 30, the ferrule 21 is pushed rearwardly by the precision sleeve 30 against the biasing of the conical spring 38 so that the flange 32 leaves from the transverse rib 16, permitting the radial movement of the ferrule 21 since the diameters of the cut 18 of the rib 16 and the aperture 37b of the stopper plate 37 are made greater than those of the bosses 33 and 35, respectively. Thus, it is easy to fit the ferrule 21 into the precision sleeve 30.

I claim:
1. An optical fiber connector, comprising:
   a connector case having a pair of front and rear transverse ribs to define a receiving cavity between them, each transverse rib having a semi-circular cut therein;
   a ferrule extending forwardly through said semi-circular cut in said front transverse rib to be fitted into a mating sleeve;
   a ferrule holder placed in said receiving cavity to hold said ferrule for axial movement and having a body portion, a pair of front and rear cylindrical bosses extending outwardly from opposite ends of said body portion, and a pair of flanges extending radially from rear ends of said cylindrical bosses, respectively;
   a stopper plate having a central aperture into which said rear cylindrical boss is inserted for sliding motion;
   a stop ring secured to a front face of said rear flange for prevent said stopper plate from falling off from said rear cylindrical boss;
   a conical spring placed between said front flange and said stopper plate for biasing said ferrule holder forwardly;
   said conical spring being arranged such that its diameter increases toward the rear end and diameters of said semi-circular cut on said front transverse rib and said central aperture of said stopper plate being set so large relative to said cylindrical bosses that a small rearward movement of said ferrule permits a large radial movement thereof, thereby making it easy to fit said ferrule into a mating sleeve.

2. The optical fiber connector of claim 1, wherein said stopper plate has a rectangular shape and provided with four bent members at corners for holding said conical spring in place so that said conical spring is in an axial agreement with said ferrule.

* * * * *